United States Patent [19]

Deroode

[11] 4,314,814

[45] Feb. 9, 1982

[54] METHOD OF AND APPARATUS FOR DECORATING SUBSTRATES

[75] Inventor: Jean R. Deroode, Lesigny, France

[73] Assignee: Essilor International, Cie Generale d'Optique, Creteil, France

[21] Appl. No.: 115,626

[22] Filed: Jan. 28, 1980

[30] Foreign Application Priority Data

Jan. 30, 1979 [FR] France ................................ 79 02331

[51] Int. Cl.³ ...................... B44C 31/00; B29C 17/00; B30B 5/02; B30B 5/04

[52] U.S. Cl. ........................................ 8/471; 156/234; 156/238; 156/540; 156/583.3; 156/286; 156/382; 427/248.1; 264/132

[58] Field of Search ............... 156/230, 231, 234, 540, 156/583.3, 542, 497, 81, 286, 238, 323, 382; 8/472, 471; 118/733, 726; 427/166, 248.1; 101/33, 34; 269/21; 264/132

[56] References Cited

U.S. PATENT DOCUMENTS

| | | | |
|---|---|---|---|
| 3,818,823 | 6/1974 | Bond | 156/230 |
| 3,847,697 | 11/1974 | Baker et al. | 156/230 |
| 3,949,574 | 4/1976 | Glover | 8/472 |
| 4,002,046 | 1/1977 | Jamin | 156/583.3 |
| 4,018,557 | 4/1977 | Glover | 8/472 |
| 4,242,162 | 12/1980 | Ronning et al. | 156/286 |

FOREIGN PATENT DOCUMENTS

| | | | |
|---|---|---|---|
| 2114925 | 6/1972 | France | 8/471 |
| 2230794 | 12/1974 | France | 8/471 |
| 2318193 | 2/1977 | France | 8/471 |
| 2364130 | 4/1978 | France . | |
| 2387793 | 11/1978 | France | 8/471 |
| 50-3045 | 1/1975 | Japan | 8/472 |
| 1517832 | 7/1978 | United Kingdom | 8/471 |
| 2000730 | 1/1979 | United Kingdom | 8/471 |

*Primary Examiner*—Edward C. Kimlin
*Assistant Examiner*—L. Falasco
*Attorney, Agent, or Firm*—Charles E. Brown

[57] ABSTRACT

This is a method of decalcomania by thermic transfer, the pattern to be printed upon the substrate (10) to be decorated being produced by means of sublimable inks upon a flexible support skin (15) and the latter being applied to the said substrate (10) in a vacuum chest (20) with which heating means (38) are associated.

According to the invention, the closure of the vacuum chest (20) is effected by the flexible support skin (15).

Application particularly to the decoration of a spectacle frame front. FIGS.1 to 8 attached.

3 Claims, 8 Drawing Figures

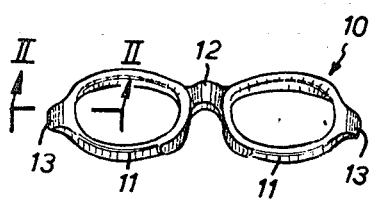
FIG.1
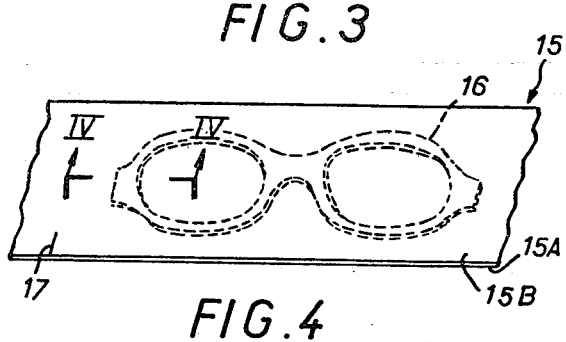
FIG.3
FIG.2
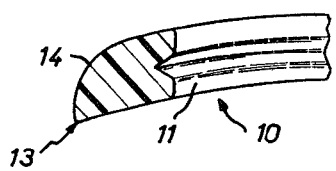
FIG.4
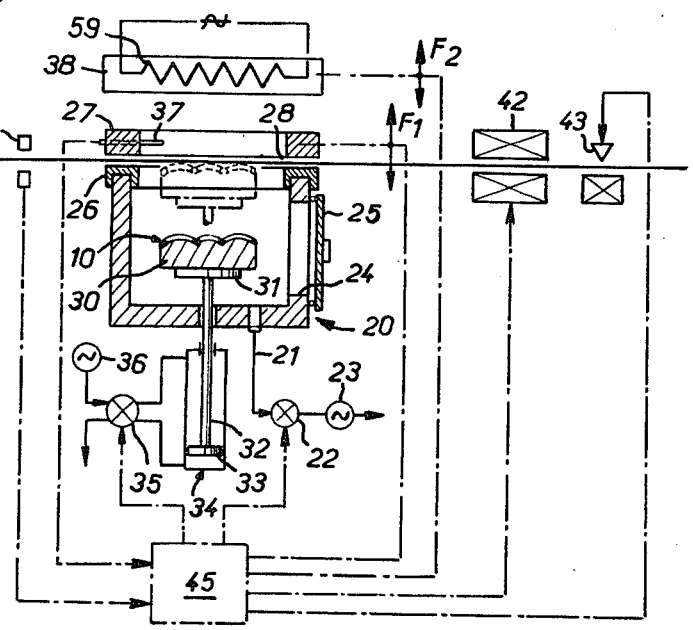
FIG.5
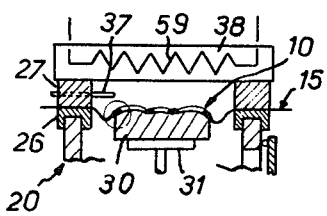
FIG.6
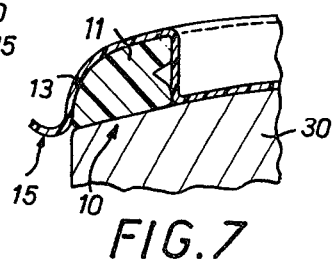
FIG.7
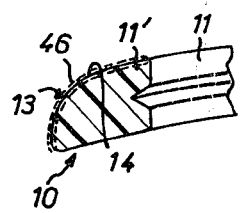
FIG.8

METHOD OF AND APPARATUS FOR DECORATING SUBSTRATES

The present invention relates generally to the three-dimensional decoration of substrates not exhibiting a particular geometrical shape, and particularly substrates of other than plane or simple geometrical surface. The invention relates more particularly, but not exclusively, to spectacle or eyeglass frame substrates made by moulding from any appropriate plastics material, whether by injection moulding or by casting moulding.

Until a short time ago, plastics spectacle or eyeglass frames were most frequently produced by cutting, or spindling, an already decorated sheet of plastics material.

At present, however, a technique is being developed according to which such spectacle frames are produced by injecting or casting material into a mould.

It is self-evident that such a production technique limits the decorative effects which it is possible to apply to such spectacle frames.

This may affect their market value.

Whatever may be the production technique of plastic spectacle frames, it appears desirable, e.g., in order to satisfy the demands of fashion, to be able to apply any one or more decorative patterns to them on demand.

The difficulty is, specifically, firstly that a spectacle frame does not in itself conform to simple geometrical shapes, and secondly that, if desired, the decorative pattern or patterns must extend not only over the front face of the frame in question, but also e.g., on its flanks.

This is then a true three-dimensional decoration, i.e., a decoration involving an other than plane surface.

As is known, only plane or geometrically simple surfaces, such as cylindrical or conical surfaces, are relatively easy to decorate, it being possible to effect their decoration e.g., by silk screen or offset printing.

However this does not apply to surfaces of more complex configuration, and this is the case of spectacle frames.

For the decoration of such surfaces, it is possible to consider employing an offset printing process employing a transfer pad of flexible material which picks up an inked pattern from a stereotype and then applies it to the substrate to be decorated by conforming, owing to its flexibility, with the any particular surface characteristics of said substrate.

But such a process has limits: it is ill-suited to substrates having irregular complex surfaces as spectacle frames, and it would be incapable of covering the whole substrate in a single pass.

Moreover, this process permits the application of only one colour at a time.

The present invention has generally as its object a method and an apparatus adapted to the three-dimensional decoration of any substrate, capable of being applied both in the case of substrates of relatively simple surface and in the case of a substrate having such an irregular complex surface as that of a spectacle frame, and likewise capable, if desired, of being applied in a single pass.

The method and the apparatus according to the invention relate generally to decalcomania by thermal transfer of sublimable printing inks from a support skin.

As is known, for the decoration of a substrate by decalcomania, one first forms on a flexible support skin, by means of one or more printing inks, the decorative pattern to be applied to said substrate, and a transfer contact is then effected between the pattern and the substrate to be decorated, i.e., a contact of such a nature as to permit a transfer of the pattern from the support skin to the substrate to be decorated.

Most frequently, in conventional decalcomania, the transfer contact is accompanied by a wetting of the support skin, such as to loosen the decorative pattern; as a variant, a simple pressure applied to the support skin under dry conditions may likewise be sufficient.

In all cases, such a decalcomania process, which incidentally is customarily applied hitherto only to plane or geometrically simple surfaces, results in a mere superficial decoration of the substrates concerned.

As applied to spectacle frames, such a superficial decoration could not be satisfactory.

Indeed, it is subject to deterioration by ageing, due to a natural scaling or scratching or abrasion, even if protective.

It is however known, in decalcomania, to thermally transfer sublimable printing inks, particularly as taught in French printed patent applications Nos. 2,364,130 and 2,114,925: a transfer contact is effected between the substrate to be decorated and a flexible support skin bearing a decorative pattern defined by one or more sublimable inks, the ink being sublimed by heating.

Such a process leads advantageously anchors the pattern in the very mass of the substrate to be decorated close to the surface of the latter.

Indeed, by virtue of the sublimation effected in contact with the substrate to be decorated, the molecules of the printing inks used migrate into the very core of the constituent substance of such a substrate, and incorporate themselves therein.

Consequently the decorative patterns thus applied by thermal transfer advantageously exhibit a high mechanical resistance to scaling, scratching and abrasion.

If desired, and this may be the case where the substrates in question are crude mouldings, they may even undergo any polishing operation without deterioration.

Furthermore, for each substrate to be decorated they may advantageously be effected in a single pass, all of the decorative patterns to be applied onto such a substrate being previously arranged on one and the same support skin.

In the above French printed patent applications it is proposed to operate in a vacuum chest in order to accelerate the thermal transfer to be performed.

But the methods described therein can only be applied to sheet substrates; in French printed patent application No. 2,364,130 the substrate to be decorated and the pattern of the support skin to be applied thereon are conjointly pressed mechanically against each other, firstly by a winding on the same drum, under the pressure of a compression belt, and secondly under the complementary effects of a compression cylinder; and in French printed patent application No. 2,114,925, in which the vacuum chest used is closed independently by a heating plate providing heat necessary for the desired thermal transfer, the substrate to be decorated, which in practice is an air-permeable textile, is placed on a grill and a printing sheet bearing the corresponding decorative pattern is applied to it.

Such methods cannot be suitable for rigid airtight substrates, exhibiting relatively irregular, complex shapes, as is the case e.g., of spectacle frames.

The method and the apparatus according to the invention enable this difficulty to be overcome.

According to the invention, it being therefore required to effect in a vacuum chest the decoration of any substrate by thermal transfer, from a flexible support skin upon which a pattern made by means of one or more sublimable printing inks is carried, said support skin is used to sealingly close off an opening in the wall for the vacuum chest.

Then, when the vacuum chest is connected to a suction or vacuum source, the support skin comes into at least local intimate contact with the substrate to be decorated, very accurately conforming to all the possible surface peculiarities or irregularities thereof, and the required transfer contact is thus fulfilled highly accurately.

Consequently it is possible, if desired, to effect the decoration of a substrate even where the latter has irregular, complex shapes, and/or even where it has not previously received a thorough polishing, such as is the case e.g., of a crude moulding substrate.

The characteristics and advantages of the invention will emerge from the description to be given hereinbelow, by way of example, and with reference to the accompanying schematic drawings wherein:

BRIEF DESCRIPTION OF DRAWINGS

FIG. 1 is a perspective view of the front of a spectacle frame to which the invention may be applied;

FIG. 2 is, on a larger scale, a partial view of said front in section made along the line II—II of FIG. 1;

FIG. 3 is a partial view in perspective of a support skin made according to the invention for the decoration of such a spectacle frame front;

FIG. 4 is, on a larger scale, a partial view in cross-section of said support skin, made along the line IV—IV of FIG. 3;

FIG. 5 is a block diagram of an apparatus adapted for performing the invention;

FIG. 6 in part repeats FIG. 5 and illustrates the mode of action of the apparatus according to the invention;

FIG. 7 repeats, on a larger scale, the detail of FIG. 6 marked by an inset VII on said FIG. 6; and FIG. 8 is a view similar to that of FIG. 2, after decoration of the spectacle frame front in question.

These figures illustrate in exemplary manner the application of the invention to the decoration of the front part 10, or face, of a spectacle frame.

It being a front of plastics material, and e.g., a face made by injection or casting moulding of acetate, acetoproprionate, polyurethane, or polyester; it may, however, likewise be a frame front made by cutting or spindling from a plate of such a material or of any other plastics material.

In the following, therefore, said face 10 constitutes the substrate to be decorated.

The surface of such a front is relatively irregular and complex, due firstly to the relative thinness of the rims 11 and of the bridge 12 which constitute it, and secondly to the curvature, or meniscusing, of said rims 11.

The decoration to be performed may altogether involve the totality of the contour of the rims 11, i.e., not only the front face thereof but also their lateral flanks or edges, or at least their external lateral flanks or edges; the same applies to the bridge 12.

As a variant, it may involve only zone of said rims and/or said bridge.

In order to simplify, it will be assumed here that decoration involves the entire frame front 10, and particularly each of the knuckles 13, or thickened portions, which the rims 11 disposed laterally for the hinges far pivotally mounting the spectacle side pieces.

As may be seen better from FIG. 2, the surface 14 of such a knuckle 13 to be decorated is curved.

According to the invention, as in decalcomania, one first of all forms, on a flexible support skin 15, the pattern 16 to be applied to the substrate to be decorated, in this case the face 10.

In the embodiment illustrated, the support skin 15 forms a ribbon or film, and for reasons which will appear hereinbelow, it carries in association with the pattern 16, at a distance from the latter, a mark 17.

The constituent material of the support skin 15 is chosen to be mouldable and printable, and to withstand relatively high temperatures, e.g., within the range between 140° C. and 200° C.

In this respect, support skins made of polypropylene, polyester, silicone, fluorocarbonic material of the type that is sold under the trademark "TEFLON", for example, may be satisfactory.

But it is self-evident that this list is not to be considered as limitative of the invention, since on the contrary other materials may be suitable.

Be that as it may, the term "destruction temperature" will be used hereinbelow to designate the temperature at which the support skin 15 is sufficiently affected by heat to become incapable of correctly performing its function as a support for the pattern 16, nor capable of being displaced and/or held in position without serious deformation.

The pattern 16 may be in one or more colours. It may be printed upon the support skin 15 by means of a corresponding number of printing inks, by any printing process of customary type, such as silk screen printing, process engraving, offset printing, example; it may likewise be effected by brush, or be transferred by decalcomania from an auxiliary printed paper support onto the support skin 15.

In all cases it forms, flat upon the support skin 15, upon a face 15A thereof, on the surface of said face, that which is to be obtained in three dimensions upon the substrate to be decorated, specifically the front 10.

According to the invention, one chooses for the printing ink, or each of the printing inks, to be employed for the production of the decorative pattern 16, a printing ink sublimable at a temperature below the destruction temperature of the support skin 15.

Obviously, such an ink must likewise be chosen so as to be compatible with the constituent material of the substrate to be decorated.

Preferably it is also a water soluble printing ink, so as to permit any excess ink to be rinsed off with water after printing.

A possible composition (I), will be given hereinbelow by way of non-limitative example:

| Solvents: | |
| --- | --- |
| butanol 1 | 43.5% |
| propanol 2 | 42.1% |
| polyoxyethylene/polypropylene: | 9.1% |
| polyvinyl-pyrrolidone: | 5.4% |
| | 100.1% |
| Dye: | |
| Sublimable pigment: 9.1% of the above solvent. | |

All the percentage values given hereinbefore refer to the weight of the substances used.

Numerous sublimable pigments may be suitable.

For example, it being required to decorate an acetate frame, the following pigments, the references of which are those of the "COLOURINDEX" and correspond to precise formulations, give satisfaction:

| Yellow | 11855 | Disperex | Yellow 3 |
|--------|-------|----------|----------|
| Red    | 60755 | Disperex | Red 4    |
| Blue   | 61555 | Disperex | Blue 3   |

The sublimation temperature of these pigments is between 120° and 140° C.

For such pigments a support skin of fluorocarbonic material may be suitable, as its destruction temperature is approximately 200° C.

Obviously the example of a composition of printing ink given hereinbefore is not to be considered as limitative of the invention, since other compositions may be suitable, depending particularly upon the sublimable pigments used.

Generally speaking the printing ink to be used contains:
one or more alcoholic solvents such as butanol or propanol,
one or more thickening/emulsifying agents, in practice polymers soluble in alcohols, such as polyoxyethylene, polypropylene, polyvinyl-pyrrolidone,
sublimable pigments.

According to the relative proportions of the constituents thus used, it is possible to regulate the drying speed of the corresponding ink upon the support skin, and/or the shade of said ink.

A single thickening/emulsifying agent may be used.

This is the case in the following compositions (II) (III):

| (II): | butanol 1 | 43.3% |
|-------|-----------|-------|
|       | propanol 2 | 41.9% |
|       | polyvinyl-pyrrolidone | 6.4% |
|       | sublimable pigment | 8.3% |
| (III): | butanol 1 | 39.9% |
|       | propanol 2 | 38.7% |
|       | polyvinyl-pyrrolidone | 5.9% |
|       | sublimable pigment | 15.4% |

Be that as it may, the thickening/emulsifying agent or agents used are chosen to permit simultaneously the coating of the pigment or pigments used, and their suspension.

After producing the pattern 16 upon the support skin 15 it is necessary, according to the invention to bring it into transfer contact with the front 10 to be decorated, i.e., a contact such as to permit a transfer of pattern from the support skin 15 to the frame front 10.

According to the invention, one employs thermal transfer, heating the pattern 16 such as to cause, at the time of the transfer contact with the front 10, an at least partial sublimation of each of the inks constituting it.

The apparatus employed for this purpose according to the invention comprises a vacuum chest 20, that is to say an enclosure connected by a conduit 21, controlled by a valve 22, to a suction or vacuum source 23, FIG. 5.

Laterally said vacuum chest 20 has an aperture 24 capable of being sealingly closed by a door 25 permitting access to its interior volume.

It is open at its upper part and has associated with it maintaining means for supporting the support skin 15 and permitting the latter to form a fluid-tight closure wall.

In the schematic embodiment illustrated, said maintaining means comprise a counterframe 26 integral with the top section of the vacuum chest 20, and a frame 27, mounted movably with reference to the vacuum chest 20, as indicated by the double arrow F1.

For the withdrawn position of the frame 27, illustrated in FIG. 5, said frame 27 forms with the counterframe 26 a slit 28 suitable for the passage of the flexible support skin 15 and, hence, for crossing the vacuum chest 20.

On the contrary, for the clamping position of the frame 27 illustrated in FIG. 6, the support skin 15 is nipped between said frame 27 and the counterframe 26, and according to the invention, thus effects the fluid-tight closure of the vacuum chest 20.

The apparatus according to the invention further comprises, in the vacuum chest 20, on a first side of the flexible support skin 15, a bracket 30, adapted to receive the substrate to be decorated, specifically the front 10, and fitted movably between a retracted position, shown by solid lines in FIG. 5, for which the front 10 is at a distance from said skin, and a deployed position, illustrated by dash lines in FIG. 5 and by solid lines in FIG. 6, for which said front 10 is in contact with the flexible support skin 15.

In the exemplary embodiment illustrated, the bracket 30, which is porous or non-porous, is integral with a plate 31 fixed to the end of a rod 32 which sealingly extends through the bottom of the vacuum chest 20 and which, at its other end is integral with the piston 33 of a double-acting piston and cylinder unit 34.

Under the control of a valve 35, said piston and cylinder unit 34 may have one or other of its ends alternately connected to a pressure source 36 or a discharge.

The apparatus according to the invention further comprises, on the other side of the flexible support skin 15, outside the vacuum chest 20, heating means adapted to act upon said flexible support skin.

In the exemplary embodiment schematically illustrated, this is a heater plate 38, with a heating resistance 59 for example, which, as indicated by the double arrow F2, is mounted movably with reference to the vacuum chest 20, above the frame 27.

In order to monitor the heating of the flexible support skin 15, the latter carries a temperature probe 37.

As mentioned hereinbefore, the flexible support skin 15 forms a ribbon which is unwound from a supply spool 39, with return roller 40, and with which there are associated feed means 42, such as sprockets meshing e.g., with apertures along one of the edges of the a skin, and if desired, a shearing device 43.

A photo-electric cell 44 is further associated therewith.

The supply means 42, conjointly with the feed spool 39, constitute passage means adapted to make the flexible support skin 15 cross the vacuum chest in line with the movable bracket 30 arranged therein, and hence in line with the frame front 10 carried by said bracket 30, the frame 27 being assumed to be in the withdrawn position.

When the photo-electric cell 44 detects the mark 17 on the flexible support skin 15, the displacement of the latter is stopped; the position of the mark 17 is such that the pattern 16 carried by the flexible support skin 15 is then located exactly in registry with the front 10.

The frame 27 is then lowered into the clamping position, FIG. 6, and the heater plate 38 is brought into position above the frame 27.

When the heating of the flexible support skin 15, which occurs from the side of the face 15B of said skin opposite to that 15A bearing the decorative pattern 16, is sufficient, under the control of the temperature probe 37, the plate 31 is raised from its retracted position, FIG. 5, into its operative position FIG. 6, where the frame front 10 comes into contact with the face 15A of the support skin 15 very precisely in line with the decorative pattern 16 carried by the latter.

Thus, with such an apparatus, the heating of the support skin, which is sufficiently intense to cause a sublimation of the printing inks constituting the pattern 16, occurs before its application to the front 10, at a distance from the latter, which spares said front, and it is thus heated that said flexible support skin is applied to said front 10.

Simultaneously with such an application, which marks the end of the ascending movement of the movable plate 31, the connection of the vacuum chest 20 to the suction source 23 is effected by the valve 22.

By virtue of the partial vacuum which then develops in the vacuum chest 20, the flexible support skin 15 comes into intimate contact with the frame front 10, conforming to its contour highly accurately, as illustrated by FIGS. 6 and 7.

This application occurs whilst the flexible support skin 15 is still at a temperature at least equal to the sublimation temperature of the inks constituting the printed pattern 16, so that said inks vaporise in contact with the front 10, and by molecular migration penetrate at least superficially into said front 10, in which they imprint an exact replica of the decorative pattern 16 carried by the flexible support skin 15.

The front 10 is left in contact with the latter for sufficient time for said process of sublimation and molecular migration to have developed correctly.

This time is generally between 10 and 30 seconds.

It is insufficient for the front 10 to be subject to any deterioration whatsoever as a result of the consequent heating affecting it.

At the end of the required sublimation, the movable plate 31 is returned into its retracted position.

The frame front 10, displaced by the bracket 30 integral with said plate 31, automatically moves away from the support skin 15.

The frame front 10 is withdrawn from the vacuum chest 20, and with another frame front 10 to be decorated, another work cycle may be performed, each corresponding feed of the support skin 15 being accompanied, if desired, by a shearing of the latter section by section by means of the device 43.

The above operations may be performed manually, one after the other.

However, and as indicated by dash lines in FIG. 5, an at least partial automation of them may be effected under the control of a logic control unit 45, which receives the information delivered by the temperature probe 37 and the photo-electric cell 44, and which consequently pilots the valves 22 and 35, suitable devices to effect the descending and ascending movements of the frame 27 and of the heater plate 38, the skin supply means 42 and the shearing device 43.

Be that as it may, after these operations, the front 10 treated is washed in water in order to eliminate any possible excess quantities of printing inks.

There remains upon the front 10, anchored in the very core of its constituent material, close to its surface, and as indicated by dotted lines in FIG. 8, the pattern 46 required for said front 10.

Obviously the present invention is not limited to the manner of embodiment described and illustrated, but embraces all variants of execution.

Furthermore, the field of application of the invention is not limited to that of the decoration of spectacle frames, but extends to that of the decoration of any substrate, whatever may be the more or less complex surface of such a substrate, and e.g., to that of spectacle lenses, or to the application of any uniform shade to such lenses, whether they be corrective lenses or simple sunglass lenses.

In all cases, according to the invention the decoration of said substrate may advantageously comprise a plurality of colours and be performed in a single pass involving the entire surface of the substrate to be decorated.

I claim:

1. A method for decorating a substrate in which a flexible support skin is provided carrying an inked pattern, the ink of said inked pattern being sublimable at a temperature below the destruction temperature of the support skin, and an enclosure having an opening in a wall and having means for connecting the opening of the enclosure to a suction source, said method comprising the steps of:

arranging the support skin to sealingly close off the opening in the enclosure with the inked pattern facing inwardly of the enclosure, and disposing in the enclosure the substrate in the immediate proximity of the opening; bringing the suction source into communication with the enclosure to provide an effective suction force and producing at least local intimate contact between the support skin and the substrate and heating the flexible support to a temperature at or above the sublimation temperature of the ink but below the destruction temperature of the support skin; and maintaining the support skin in contact with the substrate for sufficient time to permit sublimation of the ink and transfer of the inked pattern to the substrate.

2. Method according to claim 1, the step of heating the substrate being carried out prior to the intimate contact being produced between the support skin and the substrate, further comprising bringing the substrate into contact with the support skin and simultaneously bringing the suction source into communication with the enclosure.

3. Method according to claim 1, the substrate being of complex configuration.

* * * * *